(12) United States Patent
Kondo et al.

(10) Patent No.: US 6,403,215 B1
(45) Date of Patent: Jun. 11, 2002

(54) ENERGY BEAM CURABLE HYDROPHILIC PRESSURE SENSITIVE ADHESIVE COMPOSITION AND USE THEREOF

(75) Inventors: Takeshi Kondo; Kiichiro Kato, both of Urawa; Kazuhiro Takahashi, Kawaguchi; Yoshihisa Minerua, Tokyo, all of (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 09/316,512

(22) Filed: May 21, 1999

(30) Foreign Application Priority Data

May 22, 1998 (JP) ............................................. 10-141534

(51) Int. Cl.$^7$ ............................... C09J 4/06; C09J 7/02; C08F 290/12
(52) U.S. Cl. ............................... 428/345; 428/525 AC; 523/111
(58) Field of Search .......................... 523/111; 428/345, 428/355 EP, 355 EN, 355 AC

(56) References Cited

U.S. PATENT DOCUMENTS

| | | | |
|---|---|---|---|
| 5,002,977 A | | 3/1991 | Seko et al. .................. 522/149 |
| 5,302,629 A | * | 4/1994 | Berejka ....................... 523/111 |
| 5,637,395 A | | 6/1997 | Uemura et al. ............. 428/343 |

FOREIGN PATENT DOCUMENTS

| | | |
|---|---|---|
| EP | 0252739 | 10/1993 |
| EP | 0859403 | 8/1998 |
| EP | 0899316 | 3/1999 |
| GB | 2312214 | 10/1997 |
| JP | 60196956 | 10/1985 |
| JP | 60223139 | 11/1985 |
| JP | 62101678 | 5/1987 |
| JP | 05077284 | 3/1993 |
| JP | 06151300 | 5/1994 |
| JP | 06287260 | 10/1994 |
| JP | 07201787 | 8/1995 |
| JP | 08027239 | 1/1996 |
| WO | WO9724378 | 7/1997 |

* cited by examiner

Primary Examiner—Daniel Zirker
(74) Attorney, Agent, or Firm—Webb Ziesenheim Logsdon Orkin & Hanson, P.C.

(57) ABSTRACT

An energy beam curable hydrophilic pressure sensitive adhesive composition includes a polymer (A) having an energy beam polymerizable group and an acid group and a neutralizer (B). Thus, a pressure sensitive adhesive composition suitable for use in a wafer surface protective sheet is provided. The wafer surface protective sheet protects a circuit pattern formed on a wafer surface from grinding dust, etc. at the time of grinding the back of the wafer. The pressure sensitive adhesive composition can easily be removed by washing with water, even if the pressure sensitive adhesive remains on the wafer surface after peeling of the pressure sensitive adhesive sheet.

4 Claims, No Drawings

ENERGY BEAM CURABLE HYDROPHILIC PRESSURE SENSITIVE ADHESIVE COMPOSITION AND USE THEREOF

FIELD OF THE INVENTION

The present invention relates to an energy beam curable hydrophilic pressure sensitive adhesive composition and a use thereof. More particularly, the present invention relates to a pressure sensitive adhesive composition suitable for use in a wafer surface protective pressure sensitive adhesive sheet which is used for protecting a circuit pattern formed on a wafer surface from grinding dust, etc. during grinding of the back of the wafer.

BACKGROUND OF THE INVENTION

Pattern is formed on a surface of a wafer of semiconductor such as silicon or gallium arsenide by, for example, the etching or liftoff method. The wafer having pattern formed on the surface generally has its patterned surface covered with a pressure sensitive adhesive sheet and, in that form, the back of the wafer is polished by means of, for example, a grinder. The first object of grinding the back of the patterned wafer is to remove any oxide layer which may occur on the back of the wafer at the etching step. The second object of grinding the wafer back is to regulate the thickness of the wafer having pattern formed thereon.

The grinding of the back of the wafer having pattern formed on its surface is conducted while washing the wafer back with purified water in order to remove dust raised by grinding and heat generated during the grinding. Before the grinding of the wafer back is conducted, the pressure sensitive adhesive sheet (surface protective sheet) is stuck to the wafer surface so that the pattern formed on the wafer surface is protected from grinding dust and washing water for grinding.

This type of pressure sensitive adhesive sheet is, for example,

- a hydrophilic one such as pressure sensitive adhesive sheet of Japanese Patent Laid-open Publication No. 62(1987)-101678 using a pressure sensitive adhesive containing a nonionic surfactant or pressure sensitive adhesive sheet of Japanese Patent Publication No. 5(1993)-77284 using a water swellable pressure sensitive adhesive, which, after the completion of the grinding, is directly peeled so that the stain on wafer surface caused by pressure sensitive adhesive components can easily be removed by washing with purified water; and
- an energy beam curable one such as pressure sensitive adhesive sheet disclosed in Japanese Patent Laid-open Publication No. 8(1996)-27239, which, after the completion of back grinding, is irradiated with energy beams to thereby extremely reduce the adhesive strength to the wafer so that traces of pressure sensitive adhesive would not remain even upon peeling of the pressure sensitive adhesive sheet.

Although the above two types of pressure sensitive adhesive sheets for wafer back grinding have appropriately been employed in view of the respective characteristics and in conformity with encountered conditions, an energy beam curable pressure sensitive adhesive sheet which exhibits low peeling resistance at the time of peeling of pressure sensitive adhesive sheet and is free from breaking the wafer would increasingly be demanded in the future in accordance with the increase of the diameter of the wafer and the reduction of the thickness of the wafer.

However, this energy beam curable pressure sensitive adhesive has not water washability. Thus, the problem would be encountered such that, when a residual pressure sensitive adhesive remains on a wafer surface for some reason (e.g., shortage in quantity of energy beams applied at the time of irradiation therewith; abnormally high temperature caused by excess irradiation; energy beam irradiation deficiency attributed to the clinging of grinding dust raised at the time of wafer back grinding onto the surface of the sheet; poor cohesive strength of the pressure sensitive adhesive; nonuniformity of the composition of the pressure sensitive adhesive; etc.), the residual pressure sensitive adhesive cannot be removed by water washing. Therefore, when conventional energy beam curable pressure sensitive adhesive remains on a wafer surface, it is common practice to conduct washing with an organic solvent. This, however, requires improvement from the viewpoint of, for example, environmental protection.

OBJECT OF THE INVENTION

It is an object of the present invention to provide a pressure sensitive adhesive composition suitable for use in a wafer surface protective sheet which, at the time of grinding of a wafer back, is used to protect the circuit pattern formed on the wafer surface from grinding dust, etc.

It is another object of the present invention to provide a pressure sensitive adhesive composition suitable for use in a wafer surface protective sheet, which, even if remaining on a wafer surface after the peeling of the pressure sensitive adhesive sheet, can easily be removed by washing with water.

SUMMARY OF THE INVENTION

The energy beam curable hydrophilic pressure sensitive adhesive composition of the present invention comprises a polymer (A) having an energy beam polymerizable group and an acid group and a neutralizer (B).

In this energy beam curable hydrophlic pressure sensitive adhesive composition, it is preferred that the polymer (A) be a polymer having a side chain of an energy beam polymerizable group, obtained by reacting an acrylic copolymer (A1) having monomer units containing functional groups with a compound (A2) containing energy beam polymerizable group and a substituent reactive with the functional groups, all or some of the functional groups being acid groups, wherein at least some of the acid groups remain in the polymer (A) even after the reaction of the acrylic copolymer (A1) with the compound (A2).

In particular, the acrylic copolymer (A1) having the monomer units containing functional groups is preferably a polymer obtained by polymerizing a polymerizable monomer (a1) containing an acid group and another monomer (a2) that is copolymerizable with the polymerizable monomer containing acid group.

It is especially preferred that the copolymerizable other monomer (a2) be a compound represented by the formula:

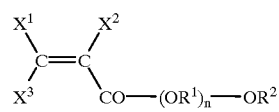

wherein each of $X^1$, $X^2$ and $X^3$ independently represents hydrogen or a methyl group; $R^1$ represents a divalent hydrocarbon group having 2 to 12 carbon atoms; $R^2$ represents a hydrocarbon group having 1 to 10 carbon atoms; and n is an integer of 1 to 10.

The energy beam curable hydrophilic pressure sensitive adhesive composition of the present invention preferably comprises a photopolymerization initiator (C) in addition to the above components.

The pressure sensitive adhesive sheet of the present invention comprises a substrate and, superimposed thereon, a pressure sensitive adhesive layer composed of the above pressure sensitive adhesive composition. The pressure sensitive adhesive sheet is preferably used in wafer processing.

This pressure sensitive adhesive sheet is preferably used in the grinding of the back of a wafer, which comprises the steps of:

sticking the pressure sensitive adhesive sheet to a patterned wafer surface, and grinding the back of the wafer while feeding water thereonto.

The pressure sensitive adhesive composition of the present invention possesses both energy bean curability and hydrophilicity. Therefore, the adhesive strength is sharply reduced by the irradiation with energy beams to thereby enable easily peeling the pressure sensitive adhesive sheet from an adherend. Further, the composition of the pressure sensitive adhesive is homogeneous and the pressure sensitive adhesive is excellent in terms of cohesive strength, so that the pressure sensitive adhesive does not remain on the adherend surface at the time of peeling of the pressure sensitive adhesive sheet. Still further, even when the pressure sensitive adhesive remains on an adherend surface for some reason, the residual pressure sensitive adhesive can easily be removed by washing with water.

DETAILED DESCRIPTION OF THE INVENTION

The energy beam curable hydrophilic pressure sensitive adhesive composition and use thereof according to the present invention will be described in detail below.

The energy beam curable hydrophilic pressure sensitive adhesive composition of the present invention comprises a polymer (A) having an energy beam polymerizable group and an acid group and a neutralizer (B). The individual components will be described with examples below.

(A) Polymer Having an Energy Beam Polymerizable Group and an Acid Group

The polymer (A) is a polymer having a repeating unit that contains an energy beam polymerizable group and a repeating unit that contains an acid group. The energy beam polymerizable group is, for example, a carbon to carbon double bond group, a carbon to carbon triple bond group or an epoxy group. A carbon to carbon double bond group is preferably employed. The acid group is, for example, a carboxyl group. This carboxyl group may be one derived from an acid anhydride. Further, the polymer (A) may contain not only the above repeating units but also other various repeating units as long as these are not unfit for the object of the present invention.

In the polymer (A), the repeating unit containing the energy beam polymerizable group is preferably contained in an amount of 0.1 to 60 mol %, still preferably 0.5 to 50 mol %, and especially preferably 1.0 to 30 mol %; the repeating unit containing the acid group is preferably contained in an amount of 0.05 to 50 mol %, still preferably 0.1 to 40 mol %, and especially preferably 0.5 to 20 mol %; and the other repeating units are preferably contained in an amount of 0 to 99.85 mol %, still preferably 0 to 99.4 mol %, and especially preferably 50 to 98.5 molt based on the total molar amount (100 mol %) of the repeating unit containing the energy beam polymerizable group, the repeating unit containing the acid group and the other repeating units.

The above polymer (A) is obtained, for example, by reacting an acrylic copolymer (A1) having monomer unit containing functional group with a compound (A2) containing energy beam polymerizable group and a substituent reactive with the functional group. All or some of the monomer units containing functional groups contain acid groups as the functional group. At least some of the acid groups remain in the polymer (A) even after the reaction of the acrylic copolymer (A1) with the compound (A2).

The polymerizable monomer containing acid groups as the functional group (a1) is a monomer having in its molecule a polymerizable double bond and an acid group such as carboxyl group and is preferably selected from among unsaturated compounds containing carboxyl group.

Specific examples of the unsaturated compounds containing carboxyl group include acrylic acid, methacrylic acid, crotonic acid, itaconic acid, maleic acid, fumaric acid, monoalkylitaconic acids, monoalkylmaleic acids, monoalkylfumaric acids and the like. Moreover, the introduction of a carboxyl group in the polymer (A) can be effected by polymerizing maleic anhydride and hydrolyzing the obtained polymer.

These polymerizable monomers containing functional group may be used either individually or in combination.

The acrylic copolymer (A1) comprises the structural units derived from the above polymerizable monomer containing acid group (a1) as essential units and may further comprise the structural units derived from the other monomer (a2) that is copolymerizable with the polymerizable monomer (a1) containing acid group.

Although various monomers can be used without any particular limitation as the other monomer (a2) that is copolymerizable with the above polymerizable monomer containing acid group (a1) as long as they are compounds having at least one polymerizable carbon to carbon double bond, it is preferred to employ the compounds represented by the formula:

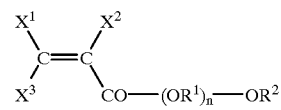

In the formula, each of $X^1$, $X^2$ and $X^3$ independently represents hydrogen or a methyl group, preferably hydrogen.

n is an integer from 1 to 10, preferably an integer from 1 to 4.

$R^1$ represents a divalent hydrocarbon group having 2 to 12 carbon atoms, preferably an alkylene group having 2 to 5 carbon atoms such as ethylene, n-propylene, isopropylene, n-butylene, isobutylene, tert-butylene, sec-butylene or n-pentylene.

Of these, ethylene, n-propylene, n-butylene and tert-butylene are preferably used as the group $R^1$.

$R^2$ represents a hydrocarbon group having 1 to 10 carbon atoms, preferably an alkyl group having 1 to 6 carbon atoms such as methyl, ethyl, n-propyl, isopropyl, n-butyl, isobutyl, tert-butyl, sec-butyl, n-pentyl, iso-pentyl, neopentyl or n-hexyl.

Of these, methyl, ethyl, n-propyl, iso-propyl, n-butyl, iso-butyl and tert-butyl are preferably used as the group $R^2$.

Accordingly, an especially preferred example of the monomer (a2) for use in the present invention is an alkoxy group containing (meth)acrylic ester such as 2-methoxyethyl (meth)acrylate, 2-ethoxyethyl (meth) acrylate, 3-methoxybutyl (meth)acrylate, 2-butoxyethyl (meth)acrylate, methoxydiethylene glycol (meth)acrylate or ethoxydiethylene glycol (meth)acrylate.

These (meth)acrylic esters containing alkoxy group can be used either individually or in combination.

In addition to the above (meth)acrylic esters containing alkoxy group, (meth)acrylic esters of alkyl having 1 to 18 carbon atoms can be used as the monomer (a2). When a monomer containing a functional group other than the acid group is used for the monomers (a2), the functional group other than the acid group can be introduced in the copolymer (A1). This functional group other than the acid group can be used in the reaction with the below described compound (A2) containing energy beam polymerizable group. The monomer containing functional group that contains the functional group other than the acid group is a monomer having in its molecule a polymerizable double bond and a functional group such as a hydroxyl group, an amino group, a substituted amino group or an epoxy group. Unsaturated compounds containing hydroxyl group and unsaturated comounds containing epoxy group are preferably used as this monomer containing functional group.

Specific examples of the unsaturataed compounds containing hydroxyl group include 2-hydroxyethyl acrylate, 2-hydroxyethyl methacrylate, 2-hydroxypropyl acrylate and 2-hydroxypropyl methacrylate.

Specific examples of the unsaturated comounds containing amino or substituted amino group include 2-aminoethyl (meth)acrylate, 2-aminoethyl(meth)acrylamide, N-methylaminoethyl (meth)acrylate and N-methylaminoethyl(meth)acrylamide.

Specific examples of the unsaturated comounds containing expoxy group include glycidyl (meth)acrylate and (meth)acrylates containing alicyclic epoxy group.

Further, the copolymer (A1) may be prepared from the above monomers plus a small amount (for example, 10% by weight or less, preferably 5% by weight or less) of vinyl formate, vinyl acetate, styrene, acrylamide, N,N-dimethylaminoethyl (meth)acrylate, N,N-dimethylaminoethyl(meth)acrylamide, acrylonitrile or the like.

The ratio of the polymerizable monomer (a1) containing acid group to the monomer (a2) that is copolymerizable with monomer (a1) (molar ratio of monomer (a1)/monomer (a2)) in the copolymer (A1) for use in the present invention preferably ranges from 1/5000 to 5/1, still preferably from 1/1000 to 2/1. The weight average molecular weight of the copolymer (A1) preferably ranges from 20 thousand to 2 million, still preferably from 50 thousand to 1.5 million.

The copolymer (A1) for use in the present invention can be obtained by copolymerizing the above polmerizable monomer (a1) containing acid group and other monomer (a2) that is copolymerizable with the monomer (a1) in given proportion. This copolymerization is preferably conducted according to the solution polymerization.

The solution polymerization is carried out by adding appropriate amounts of a solvent such as ethyl acetate and a polymerization initiator such as azobisisobutyronitrile to a mixture of the above monomers (a1) and (a2), agitating the mixture under a stream of nitrogen at room temperature for about 30 minutes and performing a reaction at 40 to 100° C. for about 4 to 10 hrs. As compared with the emulsion polymerization, this solution polymerization has such advantages that neither emulsifier nor thickener is needed to thereby enable decreasing the amount of impurity ions and that the control of polymerization conditions and change of composition of the reaction polymer can be easily performed. Moreover, a surprising effect is realized such that the polymer produced by the solution polymerization is strong in shearing direction action as compared with the polymer produced by the emulsion polymerization.

The above copolymers (A1) can be used either individually or in combination.

The polymer (A) is obtained by reacting the above copolymer (A1) with the energy beam polymerizable group containing compound (A2) having a substituent which reacts with the functional group such as an acid group contained in the copolymer (A1).

The compound (A2) containing energy beam polymerizable group contains a substituent which can react with the functional group (such as an acid group) of the acrylic copolymer (A1). This substituent is various depending on the type of the above functional group. For example, when the functional group is a hydroxyl or carboxyl group, the substituent is preferred to be an isocyanate, epoxy group or the like. When the functional group is an amino or a substituted amino group, the substituent is preferred to be an isocyanate group or the like. When the functional group is an epoxy group, the substituent is preferred to be a carboxyl or hydroxyl group. One substituent is contained in every molecule of compound (A2) containing energy beam polymerizable group.

Further, 1 to 5, preferably 1 to 2 energy beam polymerizable groups are contained in every molecule of comound (A2) containing energy beam polymerizable group.

Examples of suitable energy beam polymerizable groups, as mentioned hereinbefore, include a carbon to carbon double bond group, a carbon to carbon triple bond group and an epoxy group. Of these, a carbon to carbon double bond group is preferred.

Specific examples of the above compounds (A2) containing the above energy beam polymerizable group include:

methacryloyloxyethyl isocyanate, meta-isopropenyl-α,α-dimethylbenzyl isocyanate, methacryloyl isocyanate and allyl isocyanate;

acryloyl monoisocyanate compounds each obtained by reacting a diisocyanate or polyisocyanate compound with hydroxyethyl (meth)acrylate;

acryloyl monoisocyanate compounds each obtained by reacting together a diisocyanate or polyisocyanate compound, a polyol compound and hydroxyethyl (meth)acrylate;

glycidyl (meth)acrylate;

(meth)acrylates containing alicyclic epoxy group;

urethane (meth)acrylates containing epoxy group;

(meth)acrylates containing hydroxyl group; and (meth)acrylic acid.

In conducting the reaction between the acrylic copolymer (A1) and the compound (A2) containing energy beam polymerizable group, appropriate selection is made taking into account the reactivity of the substituent contained in the comound (A2) containing energy beam polymerizable group and the acid group or other functional group contained in the acrylic copolymer (A1).

For example, the reaction between a hydroxyl group and an isocyanate group is generally conducted at about room temperature under atmospheric pressure over a period of about 24 hrs. This reaction, for example, is effected in a solution such as an ethyl acetate solution in the presence of a catalyst such as dibutyltin laurate, triethylamine, N,N,N', N'-tetramethyl-1,3-butanediamine or 1,4-diazabicyclo[2,2,2]octane.

On the other hand, the reaction between a carboxyl group and an epoxy group is generally conducted at temperatures ranging from room temperature to about 120° C. under atmospheric pressure over a period of about 24 hrs In this reaction, a catalyst such as a tertiary amine, an ammonium salt or a metal catalyst is used.

As a result, the functional group present in the side chain of the acrylic copolymer (A1) reacts with the substituent of the compound (A2) containing energy beam polymerizable group, so that the energy beam polymerizable group is introduced in the side chain of the acrylic copolymer (A1), thereby obtaining the polymer (A).

The molecular weight (weight average) of the polymer (A) is preferably in the range of 20 thousand to 3 million, still preferably 50 thousand to 2 million, and especially preferably 60 thousand to 1.8 million. The glass transition temperature of the polymer (A) is generally up to 20° C., preferably about −70 to 0° C. The polymer (A) exhibits adherence at ordinary temperature (23° C.).

This polymer (A) contains the energy beam polymerizable group, so that the irradiation with energy beams causes the polymer (A) to undergo polymerization and curing with the result that the adherence thereof is lost. Further, the above-mentioned amount of acid group remains in the polymer (A).

(B) Neutralizer

The neutralizer (B) is used to neutralize some or all of the acid groups such as carboxyl groups which remain in the above polymer (A) so as to impart hydrophilicity or water solubility to the polymer (A).

Taking into account ionic impurities which are detrimental to the wafer or other adherend, it is preferred that a compound not containing any of metals and halogens in its molecule be used as the neutralizer (B). Although various basic compounds can be employed, unsubstituted or substituted amines are preferably used in the present invention of them, water soluble amine compounds are especially preferred.

Examples of these amine compounds include ammonia, ammonium salts exhibiting alkalinity and organic amino compounds exhibiting alkalinity, for example, primary amines such as monoethylamine and monoethanolamine; secondary amines such as diethylamine and diethanolamine; tertiary amines such as triethylamine, triethanolamine, N,N-dimethylformamide diethylacetal, N,N,N'-trimethylethylenediamine, N-methyldiethanolamine and N,N-diethylhydroxylamine; amino compounds having a plurality of nitrogen atoms in each molecule, such as diamine and polyethyleneimine; and cyclic amino compounds such as pyridine.

Triethanolamine and N,N-dimethylformamide diethylacetal are especially preferably used in the present invention.

The above neutralizers can be used either individually or in combination.

The neutralizer (B) is preferably used in an amount of 0.0001 to 1 mol, still preferably 0.001 to 0.75 mol, per mol of acid group remaining in the above polymer (A).

The mixing of the polymer (A) with the neutralizer (B) is conducted, for example, by adding the neutralizer (B) directly or after dilution with a solvent (e.g., alcohol or acetone) to the polymer (A) at room temperature and, thereafter, agitating the mixture at 5 to 40° C. for at least 25 minutes.

As a result, the acid group (e.g., carboxyl group) remaining in the polymer (A) reacts with the neutralizer (B), so that the neutralizer (B) is brought into the polymer (A) with the result that the hydrophilicity attributed to the neutralizer is imparted.

Thus, the energy beam curable hydrophilic pressure sensitive adhesive composition of the present invention is obtained.

(C) Photopolymerization Initiator

When curing is conducted by irradiation with light, the energy beam curable hydrophilic pressure sensitive adhesive composition of the present invention can be doped with a photopolymerization initiator (C). The duration of polymerization/curing by irradiation with light and the light dosage can be reduced by the doping with the photopolymerization initiator (C).

Examples of suitable photopolymerization initiators include 1-hydroxycyclohexyl phenyl ketone, benzoin, benzoin methyl ether, benzoin ethyl ether, benzoin isopropyl ether, benzyl diphenyl sulfide, tetramethylthiuram monosulfide, azobisisobutyronitrile, dibenzyl, diacetyl, β-chloroanthraquinone and the like.

It is preferred that the photopolymerization initiator (C) be used in an amount ranging from 0.05 to 15 parts by weight, especially from 0.1 to 10 parts by weight, and still especially from 0.5 to 5 parts by weight, per 100 parts by weight of the polymer (A).

Other Components

Moreover, a crosslinking agent (D) can be added to the energy beam curable hydrophilic pressure sensitive adhesive composition of the present invention. The crosslinking agent (D) is used to partially crosslink the above polymer (A). As the crosslinking agent (D), use can be made of, for example, compounds having a glycidyl group in its molecule, e.g., epoxy crosslinking agents such as neopentyl glycol diglycidyl ether, polyethylene glycol diglycidyl ether, bisphenol A diglycidyl ether, bisphenol F diglycidyl ether, diglycidyl phthalate, dimer acid diglycidyl ether, triglycidyl isocyanurate, diglycerol triglycidyl ether, sorbitol tetraglycidyl ether, N,N,N',N'-tetraglycidyl-m-xylenediamine, 1,3-bis(N,N-diglycidylaminomethyl)cyclohexane and N,N,N', N'-tetraglycidyldiaminodiphenylmethane; compounds having an isocyanate group in its molecule, e.g., isocyanate crosslinking agents such as tolylene diisocyanate and diphenylmethane diisocyanate; methylol crosslinking agents such as melamine and phenol; chelating crosslinking agents; aziridine crosslinking agents and the like.

Effecting a partial crosslinking of the polymer (A) with the crosslinking agent (D) enables regulating the peeling strength of obtained pressure sensitive adhesive composition to an appropriate value and enables producing a pressure sensitive adhesive which swells in water without being dissolved therein.

The crosslinking agent (D) is preferably used in an amount of 0.001 to 1.0 mol, still preferably 0.01 to 0.75 mol, per mol of functional group which finally remains after the steps of introducing the energy beam polymerizable group in the polymer (A) and adding the neutralizer thereto.

The polymer (A) can be partially crosslinked by adding the crosslinking agent (D) as it is or after dilution with a solvent (e.g., toluene, ethyl acetate or isopropyl alcohol) to the above pressure sensitive adhesive composition at room temperature and agitating the mixture at 5 to 40° C. for at least 5 minutes.

Still further, a water soluble organic compound (E) can be added to the pressure sensitive adhesive composition of the present invention. For example, a polyolefin glycol surfactant and a nonionic surfactant can be preferably used as the water soluble organic compound (E).

Examples of suitable polyolefin glycol surfactants include polyethylene glycol alkylphenyl ethers, polyethylene glycol alkyl ethers, polyethylene glycol fatty acid esters and polypropylene glycol polyethylene glycol ether. Especially, those whose HLB value is in the range of 8 to 18 are preferably used. It is desirable to add the polyolefin glycol surfactant in an amount of about 0.1 to 10 parts by weight, especially 0.5 to 8 parts by weight, per 100 parts by weight of pressure sensitive adhesive composition.

Examples of suitable nonionic surfactants include polyoxyethylene octylphenol ether, alkanolamides, polyoxyethylene nonylphenol ether, polyethylene glycol, polyethyleneoxylauryl ether and the like.

In addition, for example, diethylene glycol monobutyl ether, triethylene glycol monomethyl ether, ethylene glycol monomethyl ether and diethylene glycol monobutyl ether acetate can be used as the water soluble organic compound. Of these, compounds having a boiling point of 100° C. or higher, especially 150° C. or higher, are preferred.

Further, water soluble polymers can be used as the water soluble organic compound. Although various polymers can be used as the water soluble polymer, those capable of exerting surfactant functions and plasticizer functions, such as polypropylene glycols, are preferred. Diol and triol type polypropylene glycols are especially preferred.

These water soluble organic compounds (E) are preferably added in an amount of about 0.01 to 50 parts by weight, still preferably 0.02 to 20 parts by weight, and optimally 0.05 to 10 parts by weight, per 100 parts by weight of pressure sensitive adhesive composition.

The above water soluble organic compounds (E) may be used either individually or in combination.

Moreover, an energy beam polymerizable compound (F) can be added to the pressure sensitive adhesive composition of the present invention. The addition of the energy beam polymerizable compound (F) enables promoting the decrease of adhesive strength effected upon irradiation with energy beams. The energy beam polymerizable compound (F) is a compound having at least one energy beam polymerizable carbon to carbon double bond in its molecule, which compound generally has a weight average molecular weight of not greater than 100,000, preferably 100 to 50,000, still preferably 500 to 30,000, and optimally 1000 to 25,000 and can be polymerized by irradiation with energy beams.

For example, energy beam polymerizable compounds disclosed in Japanese Patent Laid-open Publication No. 60(1985)-196,956 and Japanese Patent Laid-open Publication No. 60(1985)-223,139 are widely used as the above energy beam polymerizable compound (F). Examples of the energy beam polymerizable compounds (F) include trimethylolpropane triacrylate, tetramethylolmethane tetraacrylate, pentaerythritol triacrylate, pentaerythritol tetraacrylate, dipentaerythritol monohydroxypentaacrylate, dipentaerythritol hexaacrylate, 1,4-butylene glycol diacrylate, 1,6-hexanediol diacrylate, polyethylene glycol diacrylate and commercially available oligoester acrylates.

In addition to the above acrylate-based compounds, urethane acrylate-based oligomers can be used as the energy beam polymerizable compound. Urethane acrylate oligomers can be obtained by reacting an isocyanate-terminated urethane prepolymer which is obtained by reacting a polyester or polyether type polyol compound with a polyisocyanate compound such as 2,4-tolylene diisocyanate, 2,6-tolylene diisocyanate, 1,3-xylylene diisocyanate, 1,4-xylylene diisocyanate or diphenylmethane-4,4'-diisocyanate with an acrylate or a methacrylate having a hydroxyl group such as 2-hydroxyethyl acrylate, 2-hydroxyethyl methacrylate, 2-hydroxypropyl acrylate, 2-hydroxypropyl methacrylate, polyethylene glycol acrylate or polyethylene glycol methacrylate.

Of these urethane acrylates, hydrophilic urethane acrylate compounds are preferably used. For example, preferred is a product obtained by reacting together a (meth)acrylic ester containing at least one hydroxyl group in its molecule, an organic polyisocyanate and a polyethylene glycol monoalkyl ether having one hydroxyl group.

The above polyethylene glycol monoalkyl ether is a compound represented by the formula: H—$(OCH_2CH_2)_n$—OR wherein R represents a lower alkyl group, and n is an integer of 3 to 40.

The details of these preferred urethane acrylate compounds are described in, for example, Japanese Patent Laid-open Publication No. 6(1994)-287260.

In the pressure sensitive adhesive composition of the present invention, the energy beam polymerizable compound (F) is preferably used in an amount of up to 150 parts by weight, still preferably up to 120 parts by weight, and optimally up to 100 parts by weight, per 100 parts by weight of polymer (A). In these amounts, the initial adhesive strength of obtained pressure sensitive adhesive is large, and the adhesive strength is sharply decreased upon irradiation with energy beams to thereby facilitate peeling from an adherend and avoid the remaining of pressure sensitive adhesive on the surface of the adherend.

Furthermore, the pressure sensitive adhesive composition of the present invention can be blended with other pressure sensitive adhesive components (G) than described above. For example, conventional pressure sensitive adhesives such as an acrylic pressure sensitive adhesive and a rubber based pressure sensitive adhesive as well as the above-mentioned acrylic copolymer (A1) can be added as the other pressure sensitive adhesive component (G). The conventional acrylic pressure sensitive adhesive and the acrylic copolymer (A1) do not contain any energy beam polymerizable group and, thus, themselves do not have polymerization activity. Of these pressure sensitive adhesive components (G), preferred is the above-mentioned acrylic copolymer (A1).

The acrylic copolymer (A1), as mentioned above, is a polymer obtained by polymerizing the polymerizable monomer (a1) containing an acid group and another monomer (a2) that is copolymerizable with the polymerizable monomer containing acid group. Alkyl (meth)acrylates whose alkyl group has 1 to 18 carbon atoms are preferably used as the monomer (a2). In addition to these monomers, vinyl acetate, styrene, vinyl chloride, etc. may be used in the copolymerization. Especially, acrylic copolymers containing carboxyl group are preferably used in the present invention.

The molecular weight of the acrylic copolymer (A1) for use as the other pressure sensitive adhesive component (G) is at least 50 thousand, preferably 100 thousand to 2 million, and still preferably 150 thousand to 1.5 million. The glass transition temperature of the acrylic copolymer (A1) is generally up to 20° C., preferably about −70 to 0° C. The acrylic copolymer (A1) exhibits adherence at ordinary temperature (23° C.).

Hydrophilicity is imparted by neutralizing the acid group of the acrylic copolymer (A1) with the neutralizer (B).

The above other pressure sensitive adhesive component (G) is preferably added in an amount of up to 200 parts by weight, still preferably up to 150 parts by weight, and optimally up to 120 parts by weight, per 100 parts by weight of polymer (A). When the amount of added other pressure sensitive adhesive component (G) is too large, it may occur that the radiation curability of the composition is lost with the result that the adhesive strength is not decreased even after irradiation with radioactive rays.

Moreover, for regulating the adhesive strength, cohesive strength, tack, molecular weight, molecular weight distribution, elasticity, glass transition temperature, hydrophilicity, water resistance, etc. of the pressure sensitive adhesive, the energy beam curable hydrophilic pressure sensitive adhesive composition of the present invention can be doped with a hydrophilic plasticizer such as a water soluble polyhydric alcohol, a tackifier resin, a pigment, a dye, a defoaming agent, an antiseptic, etc. according to necessity in an amount not detrimental to the object of the present invention.

These other components are preferably added in an amount of about 0.01 to 100 parts by weight per 100 parts by weight of polymer (A), although depending on the particular purpose of the addition of each individual component.

Energy Beam Curable Hydrophilic Pressure Sensitive Adhesive Composition

The energy beam curable hydrophilic pressure sensitive adhesive composition of the present invention can be obtained by blending together the above polymer (A) and neutralizer (B), optionally together with the above photopolymerization initiator (C) and other components, by the customary method.

This energy beam curable hydrophilic pressure sensitive adhesive composition can be cured by irradiation with energy beams to such a degree that the amount of pressure sensitive adhesive remaining on an adherend after peeling can extremely be reduced.

For example, ultraviolet rays and electron beams are used as the energy beams. The energy beam dosage is varied depending on the formulation of the pressure sensitive adhesive and the type of applied energy beams. For example, when using ultraviolet rays, the dosage thereof is preferred to range from about 40 to 200 W/cm. When using electron beams, the dosage thereof is preferred to range from about 10 to 1000 krad. This energy beam irradiation realizes a marked reduction of the adhesive strength of the composition of the present invention. For example, whereas the adhesive strength to a specular surface of semiconductor wafer ranges from about 100 to 1000 g/25 mm before the energy beam irradiation, the adhesive strength after the energy beam irradiation can be controlled so as to become about 0.5 to 50% of that before the energy beam irradiation.

Moreover, the pressure sensitive adhesive composition of the present invention maintains hydrophilicity even after having been cured by energy beams.

For example, when a partially crosslinked polymer is used as the polymer (A), it finitely swells in a crosslinked state upon contacting with water. The pressure sensitive adhesive polymer swells even after irradiation with energy beams, so that, even if the pressure sensitive adhesive remains on the wafer surface, washing thereof can easily be performed.

The hydrophilicity of the pressure sensitive adhesive is evaluated as follows. That is, only the pressure sensitive adhesive is stuck to an adherend (specular surface of semiconductor wafer) and dipped in 23° C. water. The time required for the pressure sensitive adhesive to be dissolved or swell in water to thereby be completely removed from the adherend is measured.

There is generally a step of washing a polished wafer with water, for example, in order to remove grinding dust therefrom.

From the viewpoint of adaptability to the step, it is preferred that the pressure sensitive adhesive composition of the present invention be removed from the adherend within 30 minutes, especially within 10 minutes. When more than 30 minutes is taken, the productivity may be unfavorably lowered.

As apparent from the above, the pressure sensitive adhesive composition of the present invention possesses hydrophilicity even after having been cured by energy beams, so that, even if the pressure sensitive adhesive remains on the adherend surface after the curing, the residual pressure sensitive adhesive can be removed by simple water washing.

Pressure Sensitive Adhesive Sheet

The pressure sensitive adhesive sheet of the present invention comprises a substrate and, superimposed thereon, a pressure sensitive adhesive layer composed of the above pressure sensitive adhesive composition.

Although the above substrate is not particularly limited, it may be selected from among, for example, films of polyethylene, polypropylene, polybutene, polybutadiene, polymethylpentene, polyvinyl chloride, vinyl chloride copolymer, polyethylene terephthalate, polybutylene terephthalate, polyurethane, ethylene/vinyl acetate copolymer, ionomer resin, ethylene/(meth)acrylic acid copolymer, ethylene/(meth)acrylic ester copolymer, polystyrene and polycarbonate, films produced by crosslinking these and films composed of laminates thereof. Furthermore, according to necessity, use can be made of films produced by coloring the above films, fluororesin films and the like. The thickness of the substrate generally ranges from about 50 to 500 μm, preferably from about 80 to 300 μm. When the thickness of the substrate is smaller than these, there is the danger that the surface protecting capability of the pressure sensitive adhesive sheet is deteriorated.

The pressure sensitive adhesive sheet of the present invention can be obtained by coating a variable substrate in appropriate thickness with the above pressure sensitive adhesive composition according to the customary technique employing a roll-knife coater, gravure coater, die coater, reverse coater or the like and drying the composition to thereby form a pressure sensitive adhesive layer on the substrate. If necessary, a release sheet is applied onto the pressure sensitive adhesive layer.

Although varied depending on the use, the thickness of the pressure sensitive adhesive layer generally ranges from about 5 to 50 μm, preferably from about 10 to 40 μm. When the thickness of the pressure sensitive adhesive layer is smaller than these, there is the danger that the surface protecting capability of the pressure sensitive adhesive sheet is deteriorated.

The configuration of the pressure sensitive adhesive sheet of the present invention is not limited and the pressure sensitive adhesive sheet may have the form of, for example, a tape or a label.

The above-pressure sensitive adhesive sheet of the present invention is suitably used in wafer processing, especially for protecting the surface of a wafer, etc.

That is, the pressure sensitive adhesive sheet comprising the above constituents prevents the penetration of grinding dust, etc. into the interface between the pressure sensitive adhesive layer and the adherend surface during the step of wafer processing to thereby enable satisfactorily protecting the wafer surface. Moreover, not only can the pressure sensitive adhesive sheet be easily peeled from the wafer after the completion of required processing but also, even if the pressure sensitive adhesive sticks to and remains on the wafer surface, the residual pressure sensitive adhesive can easily be washed away with water.

Method of Use

The above pressure sensitive adhesive sheet of the present invention can suitably be used as a surface protective sheet, especially during wafer processing. A method of grinding a wafer back with the use of the pressure sensitive adhesive sheet of the present invention will be described below.

When a release sheet is disposed on an upper surface of the pressure sensitive adhesive sheet, the release sheet is removed. Subsequently, a wafer whose back is to be polished is stuck to the pressure sensitive adhesive layer. This sticking is so conducted that a patterned surface of the wafer contacts the pressure sensitive adhesive layer.

In this form, the wafer back is polished by means of a grinder or the like to thereby not only remove any oxide layer having occurred on the wafer back but also regulate the thickness of the wafer to desired one. During this step, for example, purified water is jetted to the wafer so that grinding dust is washed away from the wafer and heat generated during the grinding is excluded.

Upon the completion of the grinding, the pressure sensitive adhesive sheet is peeled from the wafer. In the pressure sensitive adhesive sheet of the present invention, as apparent from the foregoing, the adhesive strength can be reduced to an extremely low level by the irradiation with energy beams, so that the pressure sensitive adhesive sheet can easily be peeled from the wafer surface. Furthermore, even if the pressure sensitive adhesive remains on the wafer surface after the peeling of the pressure sensitive adhesive sheet, the residual pressure sensitive adhesive can easily be washed away with purified water.

In summing up, the pressure sensitive adhesive layer of the pressure sensitive adhesive sheet of the present invention is composed of the pressure sensitive adhesive composition that contains specified components, so that the adhesive strength is extremely reduced by the irradiation with energy beams to thereby enable easily conducting the peeling. Moreover, even if the pressure sensitive adhesive remains on the wafer surface, the residual pressure sensitive adhesive can be washed away with purified water without using an organic solvent such as trichlene. Therefore, there is no danger of having a bad influence on human health or causing environmental pollution. Although the prior art has required two steps of washing the wafer surface having the pressure sensitive adhesive adhering thereto with an organic solvent such as trichlene and, thereafter, washing with water, only washing of the wafer surface having the pressure sensitive adhesive adhering thereto with purified water, for example, in an ultrasonic washer is satisfactory in the present invention with the result that the washing can be accomplished by one step in the present invention. Furthermore, the pressure sensitive adhesive sheet of the present invention is stuck to the wafer with satisfactory adhesive strength during the grinding of the wafer back, so that penetration of wafer grinding dust into the interface between the wafer surface and the pressure sensitive adhesive sheet to thereby destruct the pattern formed on the wafer surface can be avoided.

In addition to the above uses, the pressure sensitive adhesive sheet of the present invention can be used in surface protection or fixing during the processing of semiconductor compounds, glasses, ceramics, metals, etc. For example, the pressure sensitive adhesive sheet can be used as a wafer fixing sheet during the dicing of semiconductor wafer into chips.

Effect of the Invention

The pressure sensitive adhesive composition of the present invention possesses both energy beam curability and hydrophilicity. Therefore, the adhesive strength is extremely reduced by the irradiation with energy beams to thereby enable easily peeling the pressure sensitive adhesive sheet from the adherend. Further, the composition of the pressure sensitive adhesive is homogeneous and the pressure sensitive adhesive is excellent in terms of cohesive strength, so that the pressure sensitive adhesive does not remain on the adherend surface at the time of peeling of the pressure sensitive adhesive sheet. Still further, even if the pressure sensitive adhesive remains on the adherend surface for some reason, the residual pressure sensitive adhesive can easily be removed by washing with water.

EXAMPLE

The present invention will further be illustrated below with reference to the following Examples which in no way limit the scope of the invention.

In the following Examples and Comparative Examples, the "residual particle", "water washability" and "adhesive strength" were evaluated in the following manners.

Measurement of Residual Particle

The pressure sensitive adhesive sheet obtained in each of the following Examples and Comparative Examples was stuck onto a specular surface of a 4-inch silicon wafer in 23° C./65% RH atmosphere by reciprocating a 2 kg rubber roller thereon, and allowed to stand still for 60 min. From the substrate film side, the pressure sensitive adhesive sheet was irradiated at a line speed of 5 m/min with ultraviolet rays emitted from a high pressure mercury lamp (80 W/cm) disposed at a distance of 10 cm from the pressure sensitive adhesive sheet. Thereafter, the pressure sensitive adhesive sheet was peeled. The number of particles having a particle size of at least 0.27 $\mu$m (diameter) remaining on the wafer surface was measured by using laser surface inspecting instrument (LS 5000 manufactured by Hitachi Electronic Engineering Co., Ltd.).

Water Washability

Only the pressure sensitive adhesive produced in each of the following Examples and Comparative Examples was applied and dried to obtain a coating with a thickness of 50 $\mu$m, cut into 20 mm squares, stuck onto a specular surface of semiconductor wafer and allowed to stand still for 20 min. The pressure sensitive adhesive layer was irradiated at a line speed of 5 m/min with ultraviolet rays emitted from a high pressure mercury lamp (80 W/cm) disposed at a distance of 10 cm from the layer. Thereafter, the wafer with pressure sensitive adhesive layer was immersed in pure water at ordinary temperature, and the time spent before the removal of the pressure sensitive adhesive was measured.

In Example 16, in place of ultraviolet irradiation, electron beam irradiation was carried out with the use of a low-energy energy beam accelerator whose accelerating voltage and beam current were set at 200 kV and 5 mA, respectively, so that the dosage was 80 kGy.

Judgment indicated in the table was made on the following criteria:
exellent: <10 min,
good: 10 to 30 min, and
failure: >30 min.

Adhesive Strength

The pressure sensitive adhesive sheet obtained in each of the following Examples and Comparative Examples was stuck onto a specular surface of a semiconductor wafer in 23° C./65% RH atmosphere by reciprocating a 2 kg rubber roller thereon, allowed to stand still for 20 min and peeled by means of a universal tensile tester (TENSILON/UTM-4-100 manufactured by Orientec Corporation) at a peeling speed of 300 mm/min to thereby determine a 180° peeling adhesive strength (g/25 mm). Also, the pressure sensitive adhesive sheet was stuck and allowed to stand still under the same conditions as mentioned above and, from the substrate film side, the pressure sensitive adhesive sheet was irradiated at a line speed of 5 m/min with ultraviolet rays emitted from a high pressure mercury lamp (80 W/cm) disposed at a distance of 10 cm from the pressure sensitive adhesive sheet. Thereafter, the 180° peeling adhesive strength was measured in the same manner. In Example 16, as mentioned in water washability test, electron beam irradiation was carried out in place of ultraviolet irradiation.

Employed abbreviations stand for the following matter.

Principal Component of Pressure Sensitive Adhesive

A: polymer A(1) containing energy beam polymerizable group: product (units containing double bond: 13.6 mol % and units containing acid group: 3.4 mol %) obtained by reacting 4 parts by weight of glycidyl methacrylate (A2) with 100 parts by weight of a 25% ethyl acetate solution of copolymer (A1) having a weight average molecular weight of 250,000, which was prepared from 90 parts by weight of 2-methoxyethyl acrylate (a2) and 10 parts by weight of acrylic acid (a1);

A(2): product (units containing double bond: 6.9 mol % and units containing acid group: 7.7 mol %) obtained by reacting 1.3 parts by weight of methacrylic acid (A2) with 100 parts by weight of a 25% ethyl acetate solution of copolymer (A1) having a weight average molecular weight of 100,000, which was prepared from 80 parts by weight of 2-methoxyethyl acrylate (a2), 5 parts by weight of methacrylic acid (a1) and 15 parts by weight of methacrylate (a2) containing alicyclic epoxy group (Cyclomer M-100 produced by Daicel Chemical Industries, Ltd.);

A(3): product (units containing double bond: 11.2 mol % and units containing acid group: 8.5 mol %) obtained by reacting 3.5 parts by weight of methacryloyloxyethyl isocyanate (A2) with 100 parts by weight of a 25% ethyl acetate solution of copolymer (A1) having a weight average molecular weight of 250,000, which was prepared from 80 parts by weight of 2-methoxyethyl acrylate (a2), 5 parts by weight of acrylic acid (a1) and 15 parts by weight of 2-hydroxyethyl acrylate (a2), the reaction mainly conducted between the OH group and the NCO group;

A(4): product (units containing double bond: 10.9 mol % and units containing acid group: 8.4 mol %) obtained by reacting 3.5 parts by weight of methacryloyloxyethyl isocyanate (A2) with 100 parts by weight of a 25% ethyl acetate solution of copolymer (A1) having a weight average molecular weight of 250,000, which was prepared from 80 parts by weight of butyl acrylate (a2), 5 parts by weight of acrylic acid (a1) and 15 parts by weight of 2-hydroxyethyl acrylate (a2), the reaction mainly conducted between the OH group and the NCO group; and A(5): product (units containing double bond: 11.8 mol % and units containing acid group: 6.4 mol %) obtained by reacting 2.5 parts by weight of hydroxymethacrylate (A2) with 100 parts by weight of a 25% ethyl acetate solution of copolymer (A1) having a weight average molecular weight of 200,000, which was prepared from 67 parts by weight of 2-methoxyethyl acrylate (a2), 30 parts by weight of alicyclic epoxy group containing methacrylate (a2) (Cyclomer M-101 produced by Daicel Chemical Industries, Ltd.) and 3 parts by weight of acrylic acid (a1).

G: other pressure sensitive adhesive component (polymer not containing any energy beam polymerizable group)

G(1): 25% ethyl acetate solution of copolymer having a weight average molecular weight of 250,000, which was prepared from 90 parts by weight of 2-methoxyethyl acrylate and 10 parts by weight of acrylic acid;

G(2): 25% ethyl acetate solution of copolymer having a weight average molecular weight of 250,000, which was prepared from 80 parts by weight of butyl acrylate, 5 parts by weight of acrylic acid and 15 parts by weight of 2-hydroxyethyl acrylate; and G(3): 25% ethyl acetate solution of copolymer having a weight average molecular weight of 250,000, which was prepared from 70 parts by weight of butyl acrylate and 30 parts by weight of 2-hydroxyethyl acrylate.

Neutralizer

B: triethanolamine.

Photopolymerization Initiator

C: 1-hydroxycyclohexyl phenyl ketone (trade mark: Irgacure 184 produced by Ciba-Geigy, Limited).

Crosslinking Agent

D: epoxy crosslinking agent (trade mark: Tetrad C produced by Mitsubishi Gas Chemical Co., Inc.).

Surfactant

E: triethylene glycol monomethyl ether.

Energy Beam Polymerizable Compound

F(1): reaction product (80% ethyl acetate solution) (weight average molecular weight: 25,000) from 343.5 parts by weight of hexamethylene diisocyanate trimer (trade mark: Coronate HX, produced by Nippon Polyurethane Co. Ltd.), 166.3 parts by weight of hydroxypropyl acrylate and 190.3 parts by weight of polyethylene glycol monomethyl ether; and F(2): reaction product (80% ethyl acetate solution) (weight average molecular weight: 2000) from 52.8 parts by weight of hexamethylene diisocyanate, 10.7 parts by weight of pentaerythritol and 36.5 parts by weight of 2-hydroxyethyl acrylate.

Examples 1 to 16 and Comparative Examples 1 to 4

The above components were blended together in accordance with the formulations of Table 1, thereby obtaining pressure sensitive adhesive compositions.

A corona treated surface of a 110 μm thick polyethylene film was coated with each of the above obtained pressure sensitive adhesive compositions so that the thickness of the coating having been dried was 20 μm. Thus, pressure sensitive adhesive sheets with a total thickness of 130 μm were obtained.

The "residual particle", "water washability" and "adhesive strength" of the obtained pressure sensitive adhesive sheets were evaluated by the above methods. The results are given in Table 1.

TABLE 1

| | Formulation of pressure sensitive adhesive (parts by weight) | | | | | | | | | | | | | | No. of residual particles (no./4" wafer) >0.27 μm | Water washability | | Adhesive strength before curing (g/25 mm) to SUS, JIS | Adhesive strength after curing (g/25 mm) to SUS (Note 1), JIS |
|---|---|---|---|---|---|---|---|---|---|---|---|---|---|---|---|---|---|---|---|
| | A | | | | | G | | | | | | | F | | | time spent before removal (min) | judgment | | |
| | (1) | (2) | (3) | (4) | (5) | (1) | (2) | (3) | B | C | D | E | (1) | (2) | | | | | |
| Ex. 1 | 100 | | | | | | | | 0.5 | 1 | 0.5 | | | | 24 | 9 | excellent | 290 | 12 |
| Ex. 2 | 70 | | | | | 30 | | | 0.5 | 1 | 0.5 | | | | 19 | 8 | excellent | 320 | 25 |
| Ex. 3 | 70 | | | | | | 30 | | 0.8 | 1 | 0.5 | | | | 33 | 15 | good | 350 | 34 |
| Ex. 4 | 50 | | | | | | | 50 | 0.5 | 1 | 0.5 | | 5 | | 18 | 6 | excellent | 280 | 12 |
| Ex. 5 | 50 | | | | | | | 50 | 0.9 | 1.5 | 0.5 | | 35 | | 9 | 17 | good | 260 | 7 |
| Ex. 6 | 100 | | | | | | | | 0.5 | 1 | 0.5 | 2 | | | 16 | 5 | excellent | 220 | 8 |
| Ex. 7 | | 100 | | | | | | | 0.6 | 1 | 0.5 | | | | 11 | 3 | excellent | 340 | 18 |
| Ex. 8 | | 70 | | | | 30 | | | 0.5 | 1 | 0.5 | | | | 35 | 4 | excellent | 350 | 25 |
| Ex. 9 | | 70 | | | | | 30 | | 0.8 | 1 | 0.5 | | | | 29 | 8 | excellent | 360 | 38 |
| Ex. 10 | | | 100 | | | | | | 0.5 | 1 | 0.5 | | | | 12 | 6 | excellent | 300 | 12 |
| Ex. 11 | | | 70 | | | 30 | | | 0.5 | 1 | 0.5 | | | | 17 | 4 | excellent | 320 | 18 |
| Ex. 12 | | | 70 | | | | 30 | | 0.8 | 1 | 0.5 | | | | 34 | 11 | good | 330 | 32 |
| Ex. 13 | | | | 100 | | | | | 1.5 | 1 | 0.5 | | | | 11 | 28 | good | 360 | 10 |
| Ex. 14 | | | | 50 | | 50 | | | 1.5 | 1 | 0.5 | | | | 33 | 10 | good | 320 | 24 |
| Ex. 15 | | | | | 100 | | | | 0.5 | 1 | 0.5 | | | | 12 | 8 | good | 300 | 15 |
| Ex. 16 | 100 | | | | | | | | 0.5 | | 0.5 | | | | 9 | 9 | excellent | 290 | 20 |
| Comp. Ex. 1 | 100 | | | | | | | | | 1 | 0.5 | | | | 57 | >120 | fail | 400 | 30 |
| Comp. Ex. 2 | 100 | | | | | | | | | 1 | 0.5 | 20 | | 5 | 532 | 2 | excellent | 30 | 9 |
| Comp. Ex. 3 | | | | | | 100 | | | 0.5 | | 0.5 | | | | 45 | 4 | excellent | 350 | — |
| Comp. Ex. 4 | | | | | | | | 100 | 0.5 | 1 | 0.5 | | 35 | | 38 | >120 | fail | 320 | 26 |

(Note 1):
The adhesive strength after ultraviolet irradiation is indicated in Examples 1 to 15 and the Comparative Examples while the adhesive strength after electron beam irradiation is indicated in Example 16.

What is claimed is:

1. An energy beam curable hydrophilic pressure sensitive adhesive composition, comprising:
   a polymer (A) having at least one energy beam polymerizable group and at least one acid group; and
   a neutralizer (B);
   wherein the polymer (A) is a polymer having a side chain of an energy beam polymerizable group obtained by reacting an acrylic copolymer (A1) having monomer units containing functional groups with a compound (A2) containing an energy beam polymerizable group and a substituent reactive with the functional groups, with at least some of the functional groups being acid groups, wherein at least some of the acid groups remain in the polymer (A) after the reaction of the acrylic copolymer (A1) with the compound (A2);
   wherein the acrylic copolymer (A1) having the monomer units containing functional groups is a polymer obtained by polymerizing a polymerizable monomer containing an acid group (a1) and another monomer (a2) that is copolymerizable with the polymerizable monomer containing the acid group; and
   wherein the copolymerizable other monomer (a2) is a compound represented by the formula:

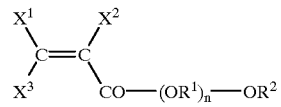

wherein each of $X^1$, $X^2$ and $X^3$ independently represents hydrogen or a methyl group; $R^1$ represents a divalent hydrocarbon group having 2 to 12 carbon atoms; $R^2$ represents a hydrocarbon group having 1 to 10 carbon atoms; and n is an integer from 1 to 10.

2. The energy beam curable hydrophilic pressure sensitive adhesive composition as claimed in claim 1, which further comprises a photopolymerization initiator (C).

3. A pressure sensitive adhesive sheet, comprising:
   a substrate coated with an energy beam curable hydrophilic pressure sensitive adhesive composition, the composition comprising:
   a polymer (A) having at least one energy beam polymerizable group and at least one acid group; and a neutralizer (B);

wherein the polymer (A) is a polymer having a side chain of an energy beam polymerizable group obtained by reacting an acrylic copolymer (A1) having monomer units containing functional groups with a compound (A2) containing an energy beam polymerizable group and a substituent reactive with the functional groups, with at least some of the functional groups being acid groups, wherein at least some of the acid groups remain in the polymer (A) after the reaction of the acrylic copolymer (A1) with the compound (A2);

wherein the acrylic copolymer (A1) having the monomer units containing functional groups is a polymer obtained by polymerizing a polymerizable monomer containing an acid group (a1) and another monomer (a2) that is copolymerizable with the polymerizable monomer containing the acid group; and wherein the copolymerizable other monomer (a2) is a compound represented by the formula:

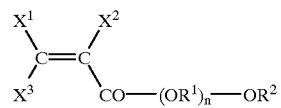

wherein each of $X^1$, $X^2$ and $X^3$ independently represents hydrogen or a methyl group; $R^1$ represents a divalent hydrocarbon group having 2 to 12 carbon atoms; $R^2$ represents a hydrocarbon group having 1 to 10 carbon atoms; and n is an integer from 1 to 10.

4. The pressure sensitive adhesive sheet as claimed in claim 3, wherein the energy beam curable hydrophilic pressure sensitive adhesive composition further comprises a photopolymerization initiator (C).

* * * * *

UNITED STATES PATENT AND TRADEMARK OFFICE
CERTIFICATE OF CORRECTION

PATENT NO. : 6,403,215 B1
DATED : June 11, 2002
INVENTOR(S) : Takeshi Kondo et al.

It is certified that error appears in the above-identified patent and that said Letters Patent is hereby corrected as shown below:

Column 2,
Line 39, "hydrophlic" should read -- hydrophilic --.

Column 4,
Line 2, "molt" should read -- mol % --.

Column 5,
Lines 25, 31 and 36, "comounds" should read -- compounds --.

Column 6,
Line 32, "comound" should read -- compound --.
Line 62, "comound" should read -- compound --.

Column 7,
Line 9, after "hrs" insert -- . --.
Line 42, "invention of" should read -- invention. Of --.

Signed and Sealed this

Fifteenth Day of October, 2002

Attest:

Attesting Officer

JAMES E. ROGAN
Director of the United States Patent and Trademark Office